United States Patent
Atai-Azimi et al.

(10) Patent No.: US 7,028,174 B1
(45) Date of Patent: Apr. 11, 2006

(54) DISK DRIVE EMPLOYING A NON-VOLATILE SERIAL SEMICONDUCTOR MEMORY FOR STORING A CONTROL PROGRAM FOR A MICROPROCESSOR

(75) Inventors: Alireza Atai-Azimi, Irvine, CA (US); Richard W. Hull, Laguna Hills, CA (US); Mark F. Vallis, Rancho Santa Margarita, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 605 days.

(21) Appl. No.: 10/261,565

(22) Filed: Sep. 30, 2002

(51) Int. Cl.
*G06F 15/177* (2006.01)
*G06F 9/445* (2006.01)

(52) U.S. Cl. ............................. 713/1; 713/2
(58) Field of Classification Search .............. 713/1, 713/2
See application file for complete search history.

(56) References Cited

U.S. PATENT DOCUMENTS

| | | | |
|---|---|---|---|
| 5,101,490 A * | 3/1992 | Getson et al. ............... | 710/15 |
| 5,535,355 A * | 7/1996 | Scales ....................... | 711/101 |
| 5,603,056 A | 2/1997 | Totani | |
| 5,826,068 A | 10/1998 | Gates | |
| 5,889,961 A * | 3/1999 | Dobbek ..................... | 709/247 |
| 5,901,225 A * | 5/1999 | Ireton et al. ................ | 714/7 |
| 5,951,685 A | 9/1999 | Stancil | |
| 6,016,547 A * | 1/2000 | Ono ............................ | 713/300 |
| 6,173,390 B1 * | 1/2001 | Kotani et al. ................ | 712/37 |
| 6,278,568 B1 * | 8/2001 | Cloke et al. ................. | 360/51 |
| 6,370,645 B1 * | 4/2002 | Lee ............................. | 713/2 |
| 6,411,227 B1 * | 6/2002 | Fish ............................ | 341/65 |

OTHER PUBLICATIONS

Johan Saelens, "Using Serial Flash Memories for Code Storage in Computer and Peripherals Applications", ST Microelectronics, Technical Article TA252, May 2002.
Atmel, "Using Atmel's Serial Data-Flash", Application Note AN-4, Jul., 2001.
Atmel, "First of a New Family of Flash Serial Memories From Atmel", World Wide Web http://www.atmel.com/atmel/news/20010207.htm, Feb. 07, 2001.

* cited by examiner

*Primary Examiner*—Thomas Lee
*Assistant Examiner*—Ji H. Bae
(74) *Attorney, Agent, or Firm*—Jason T. Evans, Esq.; Howard H. Sheerin, Esq.

(57) ABSTRACT

A disk drive is disclosed comprising a microprocessor, a non-volatile serial semiconductor memory for storing code segments of a control program, a first semiconductor memory for storing code segments of a loader program, and a second semiconductor memory for receiving the code segments of the control program. When the disk drive is powered on, the microprocessor executes the loader program from the first semiconductor memory to load the control program from the non-volatile serial semiconductor memory into the second semiconductor memory. The microprocessor then executes the control program from the second semiconductor memory.

33 Claims, 6 Drawing Sheets

BOOT BLOCK HEADER

| BLOCK ID | BLOCK ATTRIB | BLOCK SIZE | PACKET SIZE | SOURCE ADDR | DESTINATION ADDR | EXECUTION ADDR | VERSION STRING | CHECK SUM |

FIG. 3A

NON-VOLATILE SERIAL SEMICONDUCTOR MEMORY MAP

- 1ST LEVEL BOOT HEADER — 40
- 2ND LEVEL BOOT HEADERS — 42
- SECOND LOADER PROGRAM — 44
- CONTROL PROGRAM — 46

DISK DRIVE EMPLOYING A NON-VOLATILE SERIAL SEMICONDUCTOR MEMORY FOR STORING A CONTROL PROGRAM FOR A MICROPROCESSOR

BACKGROUND OF THE INVENTION

1. Field of the Invention

The present invention relates to disk drives for computer systems. More particularly, the present invention relates to a disk drive employing a non-volatile serial semiconductor memory for storing a control program for a microprocessor.

2. Description of the Prior Art

A disk drive typically comprises at least one microprocessor which executes a control program to implement the various operations of the disk drive, such as host interface, disk interface, caching, servo control, etc. The control program is typically stored and executed from an external non-volatile semiconductor memory, such as a parallel flash. Time-critical code segments of the control program (e.g., servo control) are typically loaded from the external semiconductor memory and stored in a static random access memory (SRAM) integrated with the microprocessor. This allows the microprocessor to execute the time-critical code segments from the SRAM to perform the real-time operations for the disk drive while executing the background code segments (e.g., heroic recovery, data lifeguard, etc.) from the much slower external semiconductor memory. However, the cost constraints of the SRAM typically preclude loading all of the time-critical code segments into the SRAM leading to microprocessor wait states to accommodate the slower external semiconductor memory. In addition, the external semiconductor memory increases the cost of the disk drive by requiring a parallel bus for interfacing with the microprocessor as well as numerous other pins (e.g., numerous power and ground pins to help decrease access time).

There is, therefore, a need to reduce the cost and performance degradation associated with storing and executing a control program from an external semiconductor memory in a disk drive.

SUMMARY OF THE INVENTION

The present invention may be regarded as a disk drive comprising a disk, a head actuated radially over the disk, a non-volatile serial semiconductor memory for storing code segments of a control program, and an integrated circuit (IC). The IC comprises a first semiconductor memory for storing code segments of a first loader program, a second semiconductor memory for receiving the code segments of the control program, and a serial interface for interfacing with the non-volatile serial semiconductor memory. The IC further comprises a microprocessor coupled to the first semiconductor memory and the second semiconductor memory over a parallel bus. The microprocessor interfaces with the first semiconductor memory over the parallel bus to execute the code segments of the first loader program to load the code segments of the control program from the non-volatile serial semiconductor memory into the second semiconductor memory over the serial interface. The microprocessor then interfaces with the second semiconductor memory over the parallel bus to execute the code segments of the control program.

In one embodiment, the first semiconductor memory comprises a non-volatile semiconductor memory, such as a read only memory (ROM) or a FLASH memory. In one embodiment, the second semiconductor memory comprises a volatile semiconductor memory, such as a static random access memory (SRAM) or a dynamic random access memory (DRAM).

In one embodiment the disk drive further comprises a data path memory for storing data read from the disk and data being written to the disk. The microprocessor loads an overflow code segment of the control program from the non-volatile serial semiconductor memory into the data path memory, and the microprocessor interfaces with the data path memory to execute the overflow code segment of the control program.

In yet another embodiment, the code segments of the control program comprise code segments of a second loader program. The code segments of the first loader program for loading the code segments of the second loader program from the non-volatile serial semiconductor memory into the second semiconductor memory over the serial interface. The microprocessor interfaces with the second semiconductor memory over the parallel bus to execute the code segments of the second loader program to load remaining code segments of the control program from the non-volatile serial semiconductor memory into the second semiconductor memory over the serial interface. In one embodiment, the code segments of the second loader program are overwritten in the second semiconductor memory when the microprocessor executes the code segments of the control program. In yet another embodiment, the first loader program comprises a plurality of procedures, and the second loader program calls at least one procedure of the first loader program.

In still another embodiment, the code segments of the control program are stored in compressed form and decompressed when loaded into the second semiconductor memory. In another embodiment, the code segments of the control program are stored in encrypted form and decrypted when loaded into the second semiconductor memory.

In yet another embodiment, the non-volatile serial semiconductor memory stores data parameters used by the control program. The microprocessor modifies the data parameters when executing the code segments of the control program, and the microprocessor loads the modified data parameters into the non-volatile serial semiconductor memory over the serial interface.

In another embodiment, the disk drive comprises a task file transferred to a host computer connected to the disk drive, wherein the first loader program modifies the task file when an error is detected while attempting to communicate with the non-volatile serial semiconductor memory.

The present invention may also be regarded as a method of booting a disk drive comprising a disk and a head actuated radially over the disk. A non-volatile serial semiconductor memory stores code segments of a control program, and an integrated circuit (IC) is coupled to the non-volatile serial semiconductor memory over a serial interface. The IC comprises a first semiconductor memory storing a first loader program and a second semiconductor memory for receiving the code segments of the control program. The code segments of the first loader program are executed from the first semiconductor memory to load the code segments of the control program into the second semiconductor memory from the non-volatile serial semiconductor memory over the serial interface. The code segments of the control program are then executed from the second semiconductor memory.

DESCRIPTION OF THE PREFERRED EMBODIMENTS

Figures 1A, 1B:
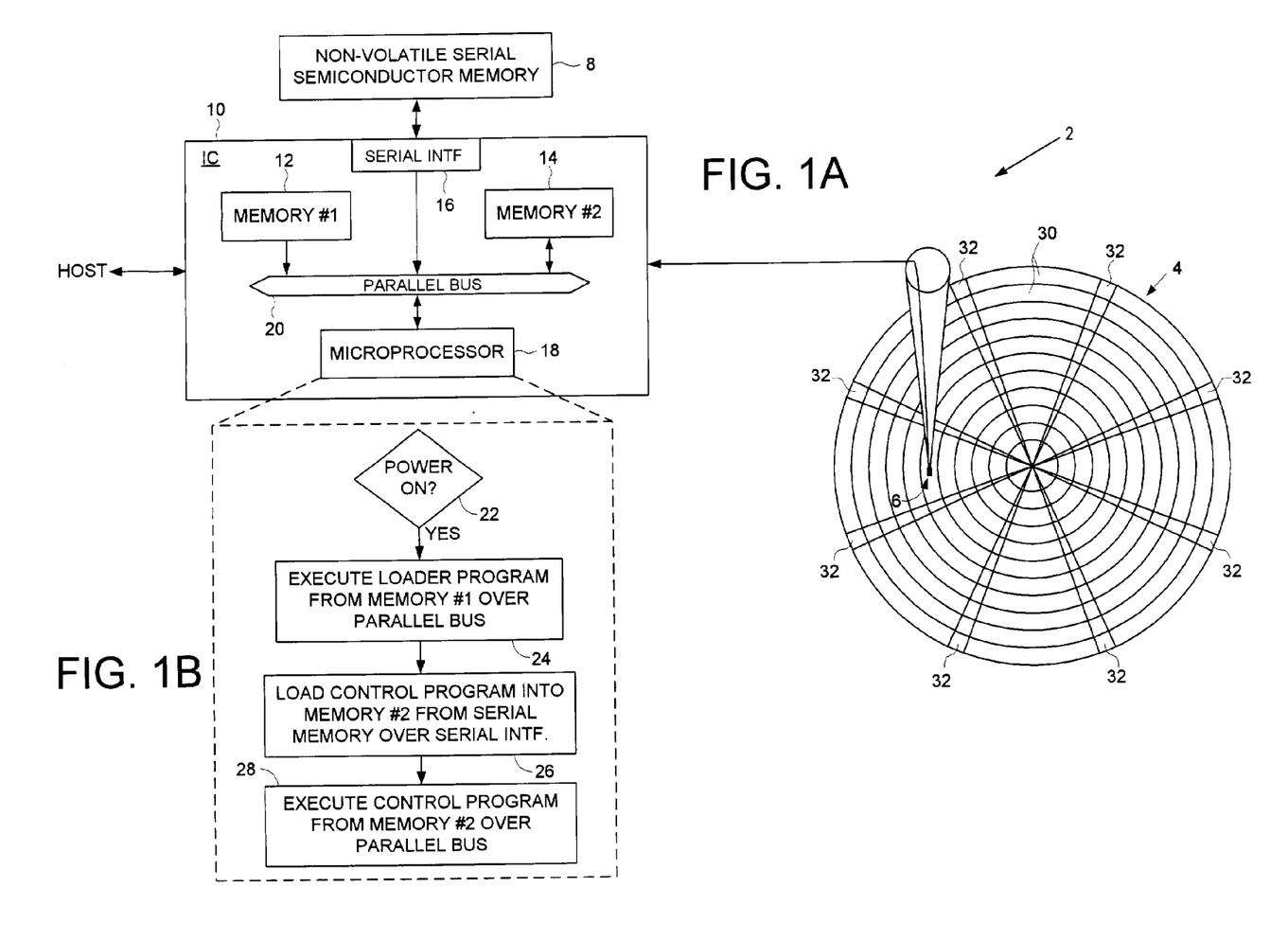
FIG. 1A shows a disk drive according to an embodiment of the present invention comprising a non-volatile serial semiconductor memory, and an integrated circuit (IC) comprising a microprocessor and a first and second semiconductor memories.
FIG. 1B is a flow diagram executed by the microprocessor including to execute a first loader program from a first semiconductor memory in order to load the control program from the serial memory into a second semiconductor memory and to execute the control program from the second semiconductor memory.

FIG. 1A shows a disk drive 2 according to an embodiment of the present invention comprising a disk 4, a head 6 actuated radially over the disk 4, a non-volatile serial semiconductor memory 8 for storing code segments of a control program, and an integrated circuit (IC) 10. The IC 10 comprises a first semiconductor memory 12 for storing code segments of a first loader program, a second semiconductor memory 14 for receiving the code segments of the control program, and a serial interface 16 for interfacing with the non-volatile serial semiconductor memory 8. The IC 10 further comprises a microprocessor 18 coupled to the first semiconductor memory 12 and the second semiconductor memory 14 over a parallel bus 20. As illustrated in the flow diagram of FIG. 1B, when the disk drive is powered on at step 22 the microprocessor 18 interfaces with the first semiconductor memory 12 over the parallel bus 20 at step 24 to execute the code segments of the first loader program. At step 26 the microprocessor 18 loads the code segments of the control program from the non-volatile serial semiconductor memory 8 into the second semiconductor memory 14 over the serial interface 16. At step 28, the microprocessor 18 interfaces with the second semiconductor memory 14 over the parallel bus 20 to execute the code segments of the control program.

In one embodiment, the disk 4 comprises a plurality of radially-spaced, concentric tracks where each track 30 is partitioned into a plurality of data sectors. Each track 30 also comprises a plurality of embedded servo sectors 32 recorded at a periodic interval around the circumference of the track 30. Each embedded servo sector 32 comprises coarse head positioning information (e.g., a track number) processed to position the head 6 over a target track, and fine head positioning information (e.g., servo bursts) processed to maintain the head 6 over a centerline of the target track during read and write operations. Any suitable disk format may be employed in the embodiments of the present invention including a spiral track format.

Any suitable non-volatile serial semiconductor memory 8 may be employed for storing the code segments of the control program, including the serial FLASH memory ST_M25P10 manufactured by STMicroelectronics and the serial FLASH memory AT_F251024N or AT_450B011 manufactured by ATMEL. Any suitable semiconductor memory may also be employed for implementing the first semiconductor memory 12 and the second semiconductor memory 14. In one embodiment, the first semiconductor memory 12 comprises a non-volatile semiconductor memory, such as a read only memory (ROM) or a FLASH memory. In one embodiment, the second semiconductor memory 14 comprises a volatile semiconductor memory, such as static random access memory (SRAM) or dynamic random access memory (DRAM). In addition, the second semiconductor memory 14 may comprise multiple types of memories, such as an SRAM segment and a DRAM segment.

Figure 2:
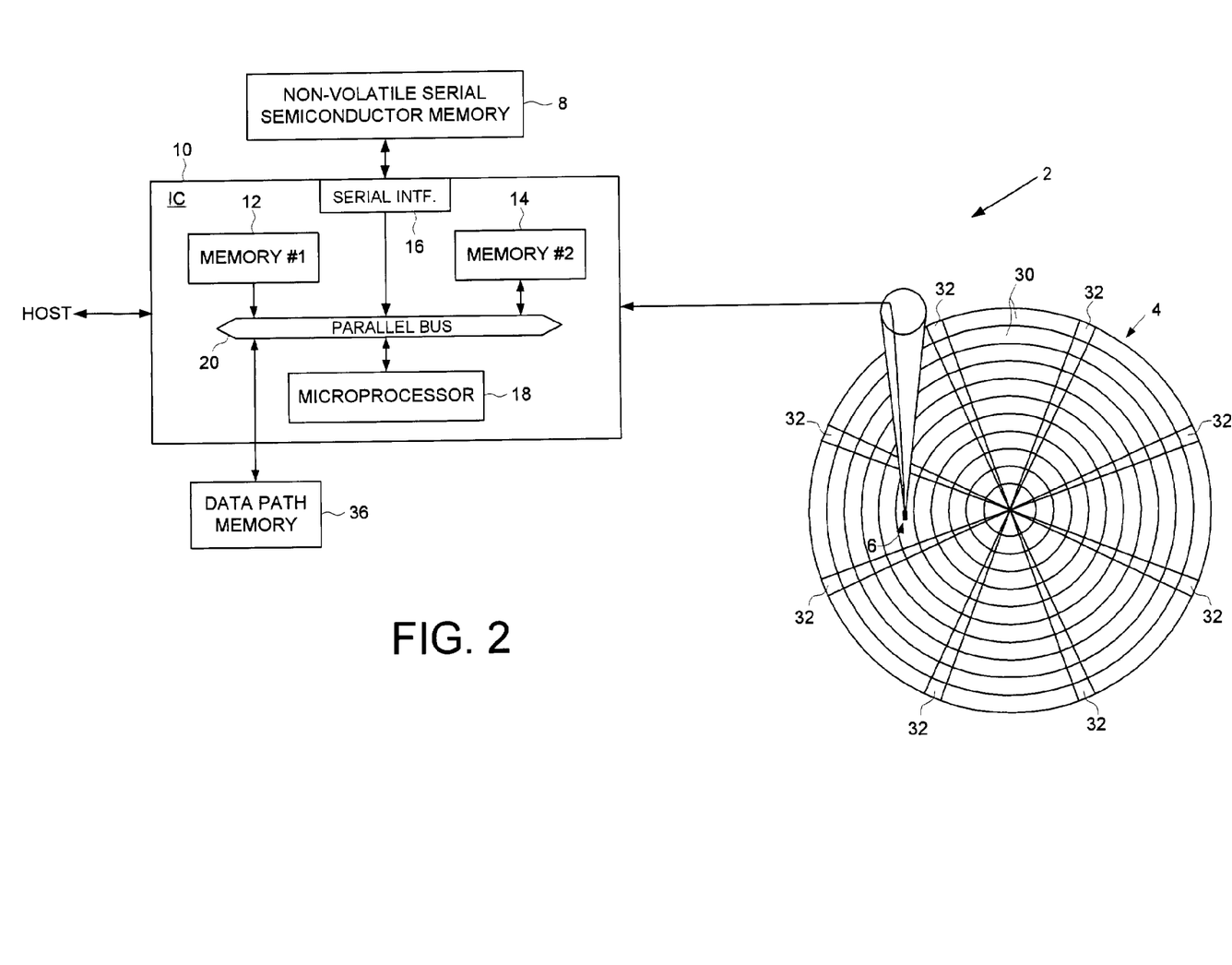
FIG. 2 shows a disk drive according to an embodiment of the present invention further comprising a data path memory for storing overflow code segments of the control program not loaded into the second semiconductor memory.

FIG. 2 shows a disk drive 34 according to an embodiment of the present invention further comprising a data path memory 36 for storing data read from the disk 4 and data being written to the disk 4. In this embodiment, the second semiconductor memory 14 does not have enough capacity to store all of the code segments of the control program. Therefore the microprocessor 18 loads the overflow code segments of the control program from the non-volatile serial semiconductor memory 8 into the data path memory 36 and executes the overflow code segments of the control program from the data path memory 36 over the parallel bus 20. In one embodiment, the data path memory 36 is significantly slower than the second semiconductor memory 14. Accordingly the code segments of the control program requiring real-time execution (e.g., servo code) are stored and executed from the second semiconductor memory 14, whereas the non-real-time code segments (e.g., diagnostic procedures) are stored and executed from the data path memory 36.

In one embodiment, the code segments of the control program comprise code segments of a second loader program. The microprocessor 18 executes the code segments of the first loader program to load the code segments of the second loader program from the non-volatile serial semiconductor memory 8 into the second semiconductor memory 14 over the serial interface 16. The microprocessor 18 interfaces with the second semiconductor memory 14 over the parallel bus to execute the code segments of the second loader program to load remaining code segments of the control program from the non-volatile serial semiconductor memory 8 into the second semiconductor memory 14 over the serial interface 16.

Figure 3A:
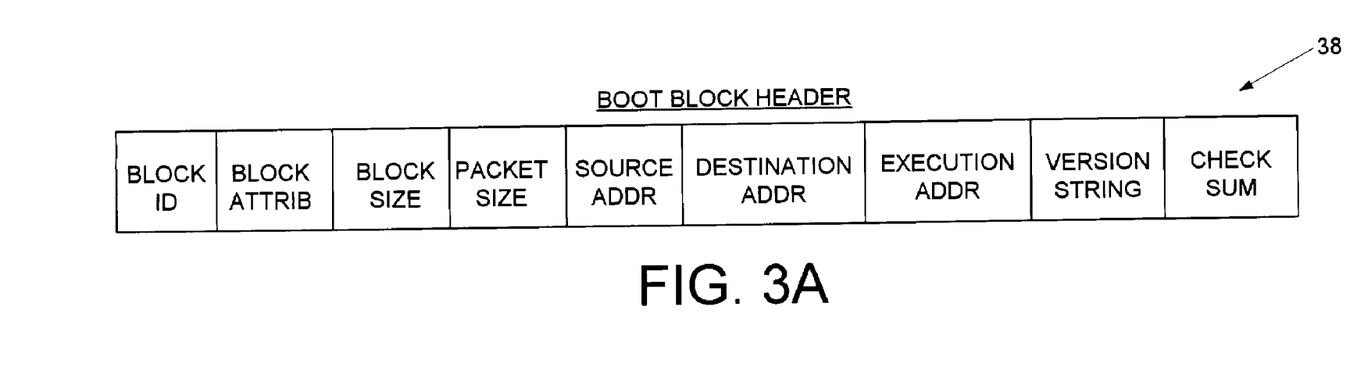
FIG. 3A shows a boot block header format used to load blocks of data from the non-volatile serial memory into the second semiconductor memory.

FIG. 3A shows the format of a boot block header 38 according to an embodiment of the present invention for use in loading code segments of the control program from the non-volatile serial semiconductor memory 8, including the code segments of the second loader program. The boot block header 38 comprises the following fields:

BLOCK ID—identifies a block of memory to load from the non-volatile serial semiconductor memory 8.

BLOCK ATTRIB—identifies various attributes of the block, such as code or data block, compressed or non-compressed block, permanent or temporary block, etc.

BLOCK SIZE—the size of the block in bytes.

PACKET SIZE—the size of each packet transmitted when loading the block.

SOURCE ADDR—the source address within the non-volatile serial semiconductor memory 8 where the block is stored.

DESTINATION ADDR—the destination address within the second semiconductor memory 14 (and in one embodiment the data path memory 36) where the block is loaded.

EXECUTION ADDR—identifies the address within the block to begin executing the second loader program or the control program.

VERSION STRING—identifies a version number for the block.

CHECK SUM—stores a checksum value for error detection.

Figure 3B:
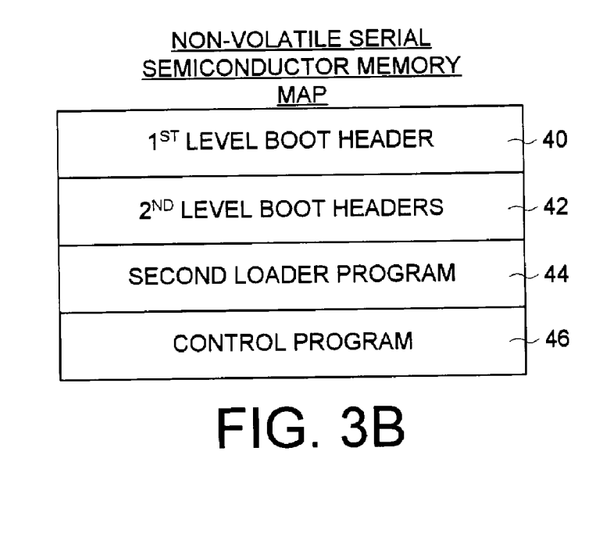
FIG. 3B shows an example memory map for the non-volatile serial semiconductor memory, including a $1^{st}$ level boot header, a plurality of $2^{nd}$ level boot headers, a second loader program, and the control program.

FIG. 3B shows an example memory map for the non-volatile serial semiconductor memory 8 according to an embodiment of the present invention. The memory map identifies a first level boot header 40, followed by a number of second level boot headers 42, followed by the code segments 44 for the second loader program, followed by the code segments 46 for the control program.

Figure 4:
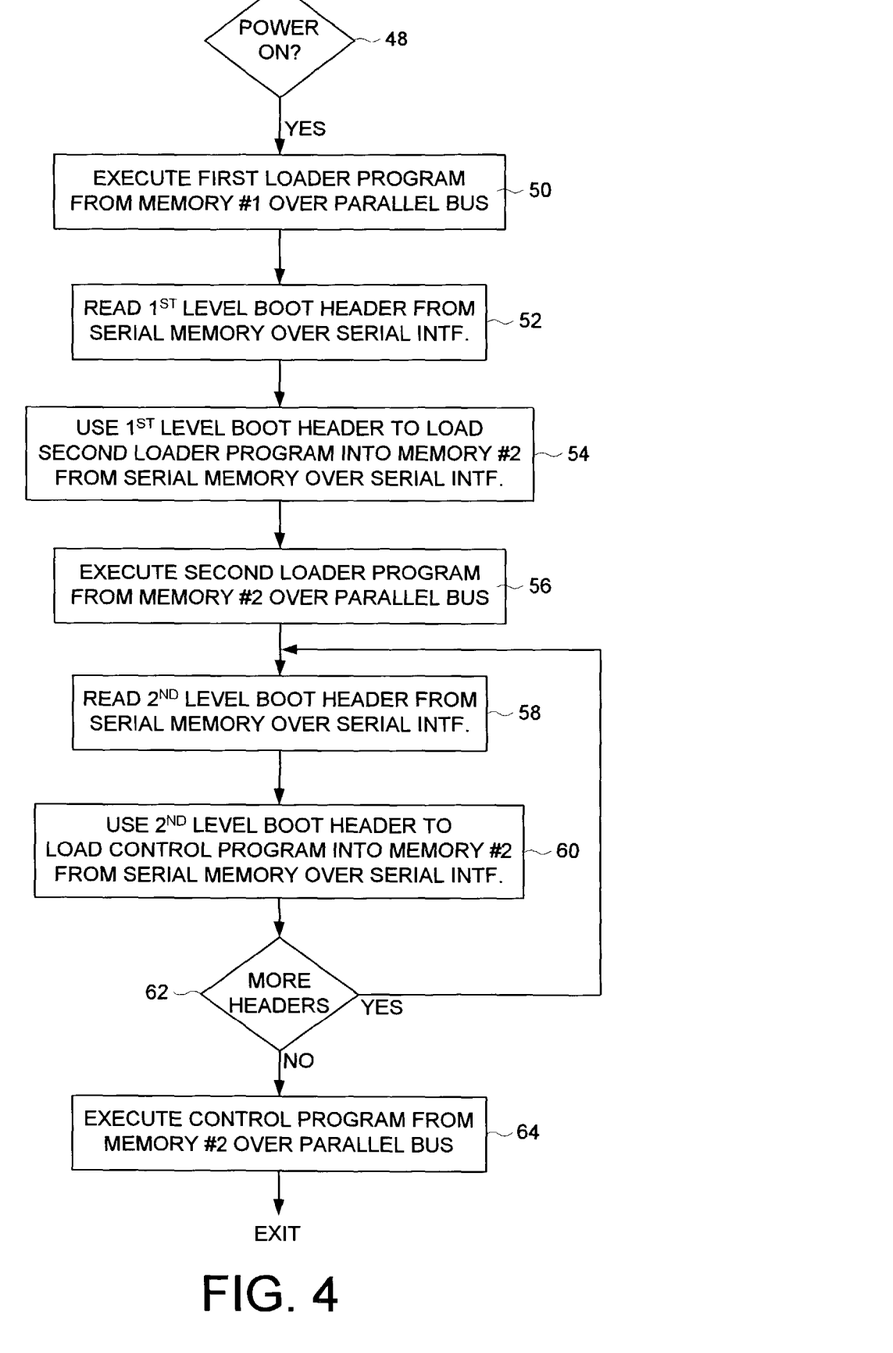
FIG. 4 is a flow diagram according to an embodiment of the present invention wherein the first loader program loads the second loader program into the second semiconductor memory, and the second loader program loads the remainder of the control program into the second semiconductor memory.

FIG. 4 is a flow diagram illustrating the steps executed by the microprocessor 18 during the boot process of the disk drive. When the disk drive is powered on at step 48, the microprocessor 18 executes the first loader program at step 50 from the first semiconductor memory 12 over the parallel bus 20. At step 52 the microprocessor 18 reads the first level boot header 40 (FIG. 3B) from the non-volatile serial semiconductor memory 8 over the serial interface 16. At step 54 the microprocessor 18 processes the first level boot header 40 to load the code segments of the second loader program 44 into the second semiconductor memory 14 over the serial interface 16. Referring again to FIG. 3A, the microprocessor 18 uses the source address of the first level boot header 40 to locate the code segments of the second loader program 44 within the non-volatile serial semiconductor memory 8, and loads the code segments into the destination address of the first level boot header 40. At step 56 of FIG. 4 the microprocessor 18 begins executing the second loader program from the second semiconductor memory 14 over the parallel bus 20 starting at the execution address of the first level boot header 40. At step 58 the microprocessor 18 reads a second level boot header 42 from the non-volatile serial semiconductor memory 8 and at step 60 loads the corresponding code segment of the control program 46 from the non-volatile serial semiconductor memory 8 into the second semiconductor memory 14 over the serial interface 16. This process repeats until the microprocessor 18 has processed all of the second level boot headers 42 at step 62. After loading the last block of code segments for the control program 46, at step 64 the microprocessor 18 begins executing the control program from the second semiconductor memory 14 over the parallel bus 20 at the execution address specified in the last second level boot header 42.

In one embodiment, the code segments of the second loader program are only temporarily stored in the second semiconductor memory 14 while executing the second loader program (as identified by the BLOCK ATTRIB field of the boot block header of FIG. 3A). After the second loader program finishes loading the control program into the second semiconductor memory 14, the microprocessor 18 overwrites the code segments of the second loader program when executing the code segments of the control program. For example, the control program may overwrite the code segments of the second loader program with program data.

In one embodiment, the code segments of the control program 46 are stored in compressed form and decompressed when loaded into the second semiconductor memory 14. This embodiment reduces the cost of the non-volatile serial semiconductor memory 8 by reducing the required capacity. In one embodiment, the first loader program decompresses the code segments of the control program 46, and in another embodiment, the second loader program decompresses the code segments of the control program 46. Any suitable compression/decompression algorithm may be employed in the embodiments of the present invention, including the well known Lempel-Ziv algorithm.

In yet another embodiment, the code segments of the control program 46 are stored in encrypted form and decrypted when loaded into the second semiconductor memory 14. This embodiment protects against competitor's reverse-engineering the control program 46. The decryption algorithm may be implemented by either the first and/or second loader programs, and any suitable encryption/decryption algorithm may be employed, including the well-known DES algorithm.

The decompression and/or decryption procedures implemented by the second loader program are examples of temporary code segments that can be overwritten by the control program since they are of no use once the loading process is complete.

In yet another embodiment, the non-volatile serial semiconductor memory 8 stores data parameters used by the control program. The microprocessor 18 modifies the data parameters when executing the code segments of the control program, and the microprocessor 18 loads the modified data parameters into the non-volatile serial semiconductor memory 8 over the serial interface 16. In one embodiment, the data parameters comprise read channel parameters (e.g., equalizer coefficients) for each zone on the disk 4. The control program may include code segments for optimizing the read channel parameters during a calibration procedure, wherein the optimized read channel parameters are loaded into the non-volatile serial semiconductor memory 8 for non-volatile storage while the disk drive is powered down.

Figure 5:
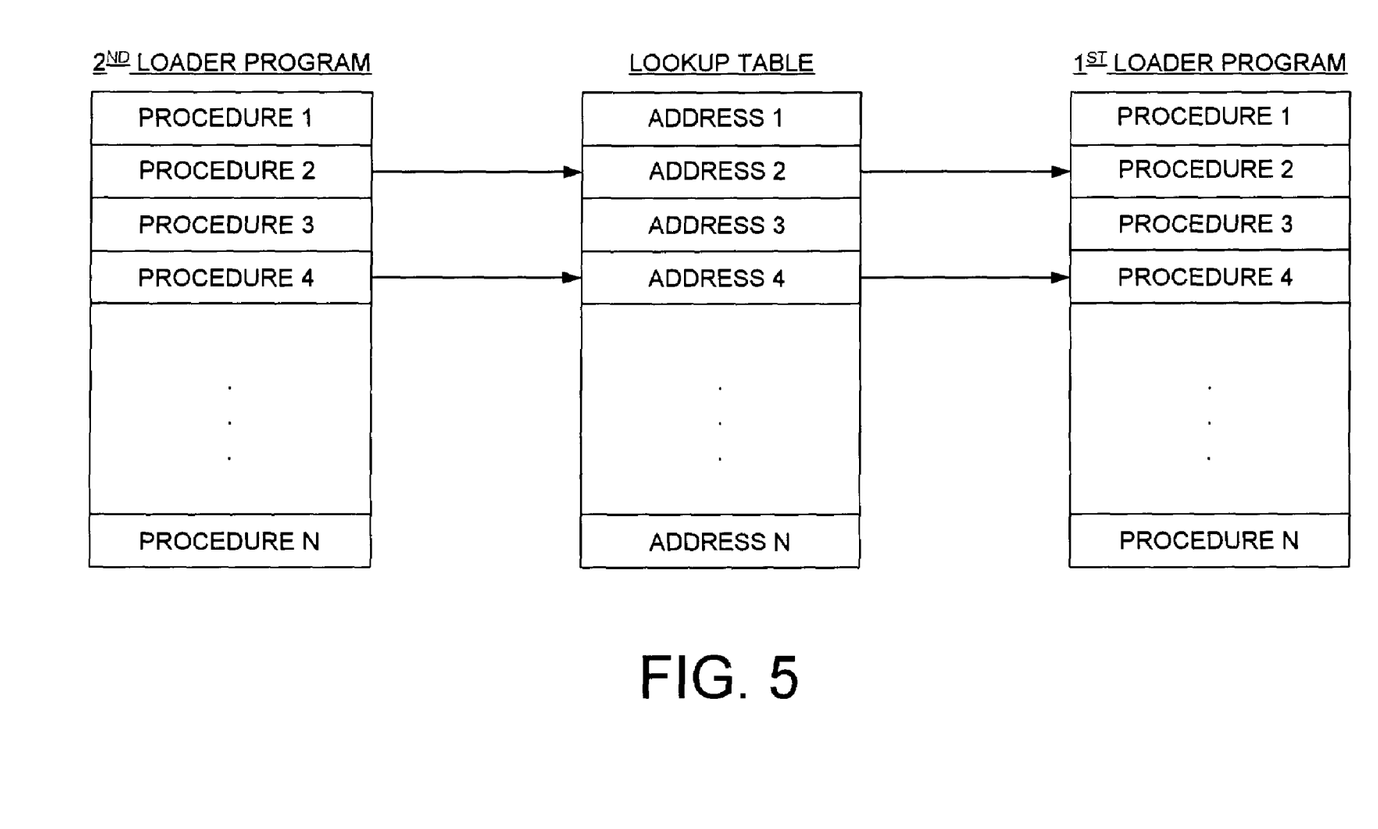
FIG. 5 illustrates an embodiment of the present invention wherein the second loader program calls procedures of the first loader program through a lookup table.

In one embodiment, the first loader program comprises a plurality of procedures and the second loader program calls at least one procedure of the first loader program. For example, the first loader program may implement procedures for communicating with the non-volatile serial semiconductor memory 8 over the serial interface 16. Rather than duplicate these procedures in the second loader program, the second loader program calls the procedures through the first loader program. FIG. 5 shows an embodiment wherein the second loader program calls the procedures of the first loader program using a lookup table. This level of indirection enables modifications to the first loader program without modifying the second loader program.

Figure 6:
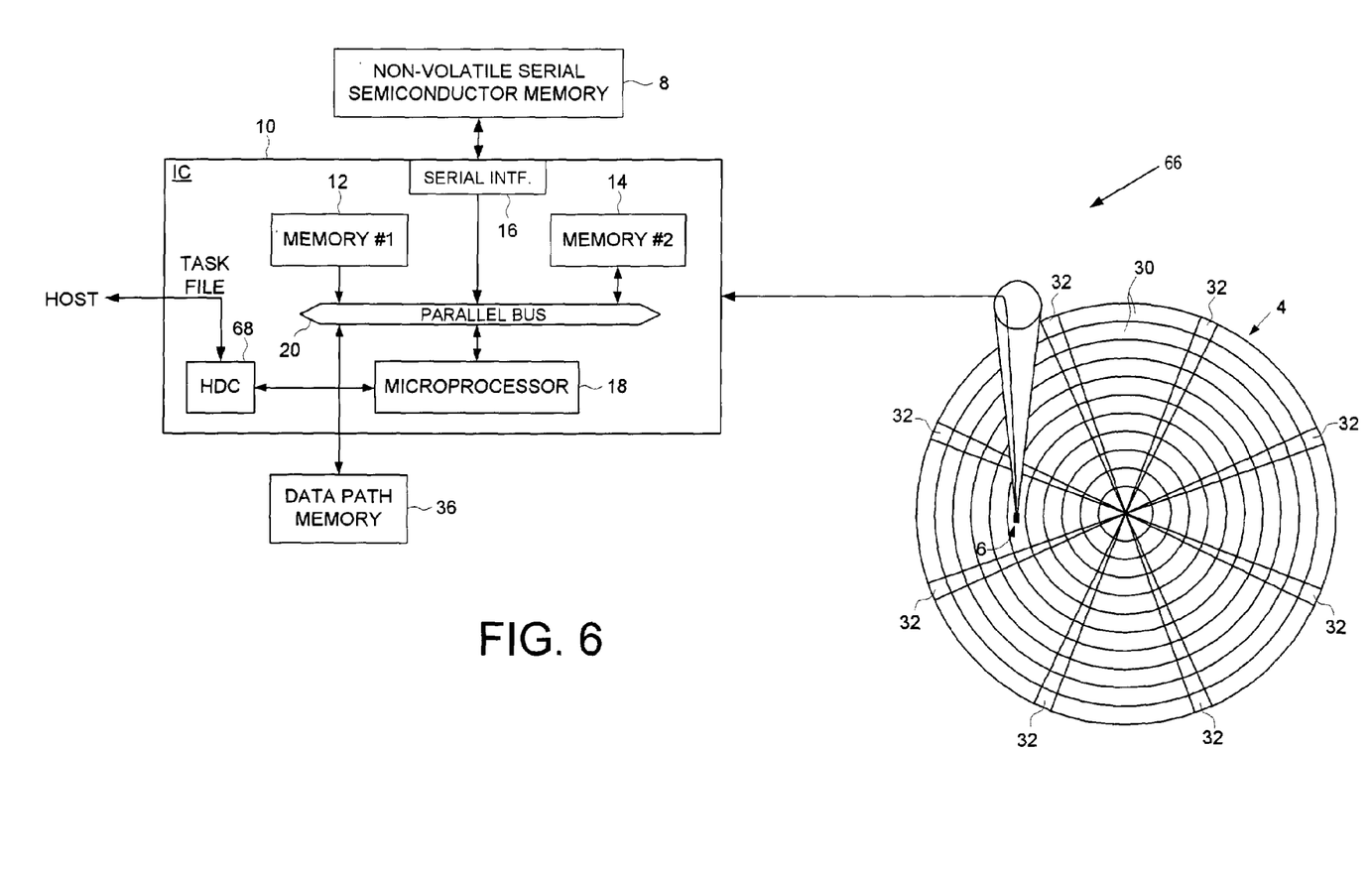
FIG. 6 shows a disk drive according to an embodiment of the present invention wherein when an error in communicating with the non-volatile serial semiconductor memory is detected, a task file of a hard disk controller (HDC) is modified and transferred to a host computer.

FIG. 6 shows an embodiment of the present invention wherein the disk drive further comprises a hard disk controller (HDC) 68 for communicating with a host computer. The HDC employs a task file for communicating with the host computer, and in one embodiment, the microprocessor 18 modifies the task file (e.g., sets a flag) if an error is detected while attempting to communicate with the non-volatile serial semiconductor memory 8. For example, when executing the first loader program the microprocessor 18 may detect a time-out error or a checksum error while communicating with the non-volatile serial semiconductor memory 8. If so, the microprocessor 18 modifies the task file which is then communicated to the host computer by the HDC 68 so that the host computer detects a fatal error with the disk drive.

In the embodiment of FIG. 1A, the first semiconductor memory 12 and the second semiconductor memory 14 are integrated with the microprocessor 18 into the IC 10. In an alternative embodiment, one or both of the semiconductor memories 12 and/or 14 are implemented as external memories.

We claim:

1. A disk drive comprising:
   (a) a disk;
   (b) a head actuated radially over the disk;
   (c) a non-volatile serial semiconductor memory for storing code segments of a control program; and
   (d) an integrated circuit (IC) comprising:
      a first semiconductor memory for storing code segments of a first loader program;
      a second semiconductor memory for receiving the code segments of the control program;
      a serial interface for interfacing with the non-volatile serial semiconductor memory; and
      a microprocessor coupled to the first semiconductor memory and the second semiconductor memory over a parallel bus, the microprocessor for:
         interfacing with the first semiconductor memory over the parallel bus to execute the code segments of the first loader program to load the code segments of the control program from the non-volatile serial semiconductor memory into the second semiconductor memory over the serial interface; and
         interfacing with the second semiconductor memory over the parallel bus to execute the code segments of the control program,
      wherein:
         the code segments of the control program comprise a second loader program;
         the first loader program is for loading the second loader program from the non-volatile serial semiconductor memory into the second semiconductor memory over the serial interface; and
         the microprocessor is for interfacing with the second semiconductor memory over the parallel bus to execute the second loader program to load remaining code segments of the control program from the non-volatile serial semiconductor memory into the second semiconductor memory over the serial interface.

2. The disk drive as recited in claim 1, wherein the first semiconductor memory comprises a non-volatile semiconductor memory.

3. The disk drive as recited in claim 2, wherein the first semiconductor memory comprises a read only memory (ROM).

4. The disk drive as recited in claim 2, wherein the first semiconductor memory comprises a FLASH memory.

5. The disk drive as recited in claim 1, wherein the second semiconductor memory comprises a volatile semiconductor memory.

6. The disk drive as recited in claim 5, wherein the second semiconductor memory comprises a static random access memory (SRAM).

7. The disk drive as recited in claim 5, wherein the second semiconductor memory comprises a dynamic random access memory (DRAM).

8. The disk drive as recited in claim 1, further comprising a data path memory for storing data read from the disk and data being written to the disk, wherein:
   (a) the microprocessor loads an overflow code segment of the control program from the non-volatile serial semiconductor memory into the data path memory; and
   (b) the microprocessor interfaces with the data path memory to execute the overflow code segment of the control program.

9. The disk drive as recited in claim 1, wherein the second loader program is overwritten in the second semiconductor memory when the microprocessor executes the code segments of the control program.

10. The disk drive as recited in claim 1, wherein:
    (a) the first loader program comprises a plurality of procedures; and
    (b) the second loader program calls at least one procedure of the first loader program.

11. The disk drive as recited in claim 1, wherein:
    (a) the code segments of the control program are stored in compressed form in the non-volatile serial semiconductor memory; and
    (b) the first loader program is for decompressing the code segments of the control program and loading the decompressed code segments into the second semiconductor memory.

12. The disk drive as recited in claim 1, wherein:
    (a) the code segments of the control program are stored in compressed form in the non-volatile serial semiconductor memory; and
    (b) the second loader program is for decompressing the code segments of the control program and loading the decompressed code segments into the second semiconductor memory.

13. The disk drive as recited in claim 1, wherein:
    (a) the code segments of the control program are stored in encrypted form in the non-volatile serial semiconductor memory; and
    (b) the first loader program is for decrypting the code segments of the control program and loading the decrypted code segments into the second semiconductor memory.

14. The disk drive as recited in claim 1, wherein:
    (a) the code segments of the control program are stored in encrypted form in the non-volatile serial semiconductor memory; and
    (b) the second loader program is for decrypting the code segments of the control program and loading the decrypted code segments into the second semiconductor memory.

15. The disk drive as recited in claim 1, wherein:
    (a) the non-volatile serial semiconductor memory stores data parameters used by the control program;
    (b) the microprocessor modifies the data parameters when executing the code segments of the control program; and
    (c) the microprocessor loads the modified data parameters into the non-volatile serial semiconductor memory over the serial interface.

16. The disk drive as recited in claim 1, further comprising a task file transferred to a host computer connected to the disk drive, wherein the first loader program for modifying the task file when an error is detected while attempting to communicate with the non-volatile serial semiconductor memory.

17. The disk drive as recited in claim 16, wherein the detected error is selected from the group consisting of a time-out error and a checksum error.

18. A method of booting a disk drive, the disk drive comprising a disk, a head actuated radially over the disk, a non-volatile serial semiconductor memory for storing code segments of a control program, and an integrated circuit (IC) coupled to the non-volatile serial semiconductor memory over a serial interface, the IC comprising a first semiconductor memory storing a first loader program and a second semiconductor memory for receiving the code segments of the control program, the method comprising the steps of:
  (a) executing the first loader program from the first semiconductor memory to load the code segments of the control program into the second semiconductor memory from the non-volatile serial semiconductor memory over the serial interface; and
  (b) executing the code segments of the control program from the second semiconductor memory,
  wherein:
    the code segments of the control program comprise a second loader program;
    the first loader program is for loading the second loader program from the non-volatile serial semiconductor memory into the second semiconductor memory over the serial interface, and
    further comprising the step of executing the second loader program to load remaining code segments of the control program from the non-volatile serial semiconductor memory into the second semiconductor memory over the serial interface.

19. The method of booting a disk drive as recited in claim 18, wherein the first semiconductor memory comprises a non-volatile semiconductor memory.

20. The method of booting a disk drive as recited in claim 19, wherein the first semiconductor memory comprises a read only memory (ROM).

21. The method of booting a disk drive as recited in claim 19, wherein the first semiconductor memory comprises a FLASH memory.

22. The method of booting a disk drive as recited in claim 18, wherein the second semiconductor memory comprises a volatile semiconductor memory.

23. The method of booting a disk drive as recited in claim 22, wherein the second semiconductor memory comprises a static random access memory (SRAM).

24. The method of booting a disk drive as recited in claim 22, wherein the second semiconductor memory comprises a dynamic random access memory (DRAM).

25. The method of booting a disk drive as recited in claim 18, wherein:
  (a) the disk drive further comprises a data path memory for storing data read from the disk and data being written to the disk;
  (b) overflow code segment of the control program from the non-volatile serial semiconductor memory are loaded into the data path memory; and
  (c) the overflow code segment of the control program are executed from the data path memory.

26. The method of booting a disk drive as recited in claim 18, wherein the second loader program is overwritten in the second semiconductor memory when the code segments of the control program are executed.

27. The method of booting a disk drive as recited in claim 18, wherein the first loader program comprises a plurality of procedures, further comprising the step of calling at least one of the procedures of the first loader program from the second loader program.

28. The method of booting a disk drive as recited in claim 18, wherein the code segments of the control program are stored in compressed form in the non-volatile serial semiconductor memory, further comprising the steps of:
  (a) decompressing the code segments of the control program; and
  (b) loading the decompressed code segments of the loader program into the second semiconductor memory.

29. The method of booting a disk drive as recited in claim 18, wherein the code segments of the control program are stored in encrypted form in the non-volatile serial semiconductor memory, further comprising the steps of:
  (a) decrypting the code segments of the control program; and
  (b) loading the decrypted code segments of the loader program into the second semiconductor memory.

30. The method of booting a disk drive as recited in claim 18, wherein the non-volatile serial semiconductor memory stores data parameters used by the control program, further comprising the steps of:
  (a) modifying the data parameters by executing the code segments of the control program; and
  (b) loading the modified data parameters into the non-volatile serial semiconductor memory over the serial interface.

31. The method of booting a disk drive as recited in claim 18, further comprising the steps of:
  (a) modifying a task file when an error is detected while attempting to communicate with the non-volatile serial semiconductor memory; and
  (b) transferring the task file to a host computer connected to the disk drive.

32. The method of booting a disk drive as recited in claim 31, wherein the detected error is selected from the group consisting of a time-out error and a checksum error.

33. A disk drive comprising:
  (a) a disk;
  (b) a head actuated radially over the disk;
  (c) a non-volatile serial semiconductor memory for storing code segments of a control program;
  (d) a first semiconductor memory for storing code segments of a first loader program;
  (e) a second semiconductor memory for receiving the code segments of the control program;
  (f) a serial interface for interfacing with the non-volatile serial semiconductor memory; and
  (g) a microprocessor coupled to the first semiconductor memory and the second semiconductor memory over a parallel bus, the microprocessor for:
    interfacing with the first semiconductor memory over the parallel bus to execute the code segments of the first loader program to load the code segments of the control program from the non-volatile serial semiconductor memory into the second semiconductor memory over the serial interface; and interfacing with the second semiconductor memory over the parallel bus to execute the code segments of the control program, wherein:

the code segments of the control program comprise a second loader program, the first loader program is for loading the second loader program from the non-volatile serial semiconductor memory into the second semiconductor memory over the serial interface; and the microprocessor is for interfacing with the second semiconductor memory over the parallel bus to execute the second loader program to load remaining code segments of the control program from the non-volatile serial semiconductor memory into the second semiconductor memory over the serial interface.

* * * * *